US012223123B2

(12) United States Patent
Chen

(10) Patent No.: US 12,223,123 B2
(45) Date of Patent: Feb. 11, 2025

(54) TEETH-OPERATED MOUTH MOUSE AND USES THEREOF

(71) Applicant: MacKay Memorial Hospital, Taipei (TW)

(72) Inventor: Yu-Jen Chen, Taipei (TW)

(73) Assignee: Mackay Memorial Hospital, Taipei (TW)

( * ) Notice: Subject to any disclaimer, the term of this patent is extended or adjusted under 35 U.S.C. 154(b) by 0 days.

(21) Appl. No.: 18/571,756

(22) PCT Filed: Jun. 22, 2021

(86) PCT No.: PCT/CN2021/101393
§ 371 (c)(1),
(2) Date: Dec. 19, 2023

(87) PCT Pub. No.: WO2022/266823
PCT Pub. Date: Dec. 29, 2022

(65) Prior Publication Data
US 2024/0288950 A1 Aug. 29, 2024

(51) Int. Cl.
*G09G 5/00* (2006.01)
*G06F 3/033* (2013.01)

(52) U.S. Cl.
CPC .................... *G06F 3/033* (2013.01)

(58) Field of Classification Search
CPC ........ G06F 3/011; G06F 3/033; G06F 3/0354; G06F 3/04892; A61F 4/00
See application file for complete search history.

(56) References Cited

U.S. PATENT DOCUMENTS 8,044,766 B2 * 10/2011 Ghovanloo ............. G06F 3/011
340/539.22
8,537,036 B2 * 9/2013 Brusell ...................... A61F 4/00
702/116

(Continued)

FOREIGN PATENT DOCUMENTS

| CN | 108509064 A | * | 9/2018 | ............. G06F 3/033 |
| KR | 20080001832 A | * | 1/2008 | |
| KR | 20190118780 A | * | 10/2019 | |

*Primary Examiner* — Joe H Cheng
(74) *Attorney, Agent, or Firm* — NZ CARR LAW OFFICE

(57) ABSTRACT

Disclosed herein are teeth-operated mouth mouses and methods of using the same. In some embodiments, the teeth-operated mouth mouse includes a mounting conforming to a row of upper teeth in the oral cavity of a user; and a plurality of sensors independently disposed at a position corresponding to an individual tooth along the mounting and wirelessly coupled to the computer for transmitting and receiving signals therebetween; wherein, each of the plurality sensors is capable of performing at least one teeth-activating task selected from the group consisting of "moving to the right", "moving to the left", "moving forward", "moving backward", and "enter". Also provided herein are methods of operating a computer with the aid of the disclosed teeth-operated mouth mouse. The method includes selectively clicking one of the plurality of sensors respectively disposed on the mounting by the lower teeth once or twice to instruct the single or double-clicked sensor to perform one of the teeth-activating tasks associated therewith.

15 Claims, 2 Drawing Sheets

(56) References Cited

U.S. PATENT DOCUMENTS

| | | | | |
|---|---|---|---|---|
| 2003/0120183 A1* | 6/2003 | Simmons | ............... | A61F 4/00 |
| | | | | 600/595 |
| 2006/0287855 A1* | 12/2006 | Cernasov | ............... | G10L 17/26 |
| | | | | 704/248 |
| 2013/0076627 A1* | 3/2013 | Xu | ............... | A61F 4/00 |
| | | | | 345/163 |
| 2015/0346840 A1* | 12/2015 | Alonaizi | ............... | G06F 3/0233 |
| | | | | 345/169 |

* cited by examiner

TEETH-OPERATED MOUTH MOUSE AND USES THEREOF

CROSS REFERENCE TO RELATED APPLICATION

This application is a U.S. National Stage Filing under 35 U.S.C. 371 from International Patent Application Serial No. PCT/CN2021/101393, filed Jun. 22, 2021, and published on Dec. 29, 2022 under WO 2022/266823, the disclosure of which is incorporated by reference herein in its entirety.

BACKGROUND OF THE INVENTION

1. Field of the Invention

The present invention relates to two novel designs of teeth-operated mouth mice, which are independently suitable for mounting in the oral cavity of an individual (e.g., a healthy or disabled subject) to assist controlling of an electronic system (e.g., computers) while minimizing the risk of contact infection.

2. Description of Related Art

A number of input devices have been developed to assist disabled individuals to control electronic systems, such as computers, tablets, and etc. Examples of such devices include eye tracking systems, the bead-mouse, and mouth-operated joysticks. Eye tracking systems track the gaze direction of the pupils of an individual to control electronic systems. A head-mouse device tracks the motion of the individual's head in order to move a cursor on a computer screen. Mouth-operated joysticks allow an individual to use their mouth or tongue to operate an electronic system such as a motorized wheelchair. However, these devices may be too expensive (e.g., eye tracking system) or too cumbersome (e.g., the head-mouse) to use, or may cause undue fatigue to the user (e.g., the individuals with poor muscle tone or spasticity).

Further, on any given day people accumulate germs on their hands from a variety of sources. This can include many sources of germs such as direct contact with other people, contaminated surfaces such as tables, escalator handholds, foods, and etc. Subsequent to these contacts, if people don't wash their hands frequently and use the correct technique, they can easily infect themselves by touching their eyes, nose, mouth, or food. Further, failure to wash their hands will also render a person a carrier who spreads germs to others by touching those people directly or by touching surfaces which others contact, such as doorknobs, faucets, counters, etc. As a consequence of inadequate hand hygiene, infectious diseases are commonly spread from one person to another, especially in this era of coronavirus pandemic. Infections are easily communicated from one person to the next.

Therefore, there is a need in the art for an input device for controlling electronic systems that is affordable, portable, easy to use by individuals with physical limitations, and minimizes fatigue, complexity of operation, and risk of contact infection during use.

SUMMARY

The present disclosure is referred to as a "Mouth Mouse." In order to alleviate the shortcomings of other input device technologies and the background art, the present invention provides an affordable and portable apparatus for the teeth-operated control of a computer system.

The objective of the present disclosure is to provide a teeth-operated mouth mouse suitable for mounting in the oral cavity of a user, thereby allowing the use to remotely operate a computer by selectively click-activating the mouth mouse with his/her teeth.

In accordance with the first aspect of the present disclosure, there is provided a teeth-operated mouth mouse, which includes,
 a mounting conforming to a row of upper teeth in the oral cavity of the user; and
 a plurality of sensors independently disposed at a position corresponding to one individual tooth along the mounting and wirelessly coupled to the computer for transmitting and receiving signals therebetween;
 wherein, each of the plurality sensors is capable of performing at least one teeth-activating task selected from the group consisting of "moving to the right", "moving to the left", "moving forward", "moving backward", and "enter".

According to embodiments of the present disclosure, the two sensors disposed at the position corresponding to the tooth in the center of the mounting are respectively disposed at an upper and lower areas of the center tooth of the mounting. Preferably, the sensor disposed at the upper area of the center tooth of the mounting is capable of performing two teeth-activating tasks that consist of "moving forward" and "enter"; while the sensor disposed at the lower area of the center tooth of the mounting is capable of performing two teeth-activating tasks that consist of "moving backward" and "enter".

The sensor disposed at the position corresponding to the tooth at the left of the center tooth of the mounting is capable of performing two teeth-activating tasks that consist of "moving to the left" and "enter"; while the sensor disposed at the position corresponding to the tooth at the right of the center tooth of the mounting is capable of performing two teeth-activating tasks that consist of "moving to the right" and "enter".

According to other embodiments of the present disclosure, the teeth-operated mouth mouse includes four sensors, in which two of the sensors are disposed at the positions corresponding to two adjacent teeth in the center of the mounting, while the other two sensors are respectively disposed at the positions corresponding to the teeth at the left and right of the two adjacent teeth in the center of the mounting. Further, each of the two sensors disposed at the positions corresponding to two adjacent teeth in the center of the mounting is capable of performing two teeth-activating tasks selected from the group consisting of "moving forward", "moving backward", and "enter", provided that when one sensor performs the task of "moving forward", then the other sensor will perform the task of "moving backward", and both sensors are capable of performing the task "enter". The sensor disposed at the position corresponding to the tooth at the left of the two adjacent teeth in the center of the mounting is capable of performing two teeth-activating tasks that consist of "moving to the left" and "enter"; while the sensor disposed at the position corresponding to the tooth at the right of the two adjacent teeth in the center of the mounting is capable of performing two teeth-activating tasks that consist of "moving to the right" and "enter".

In accordance with the second aspect of the present disclosure, there is provided an alternative form of the teeth-operated mouth mouse. In this alternative form, the teeth-operated mouth mouse includes, a first, second and third mountings, in which the first mounting conforms to two adjacent upper teeth in the oral cavity of the user, while the second and third mountings are respectively disposed at the left and right of the first mounting and independently conforms to one upper tooth in the oral cavity of the use; and a first, second, third and fourth sensors respectively disposed on the first, second and third mountings and wirelessly coupled to the computer for transmitting and receiving signals therebetween;

wherein, each of the first, second, third and fourth sensors is capable of performing at least one teeth-activating task selected from the group consisting of "moving to the right", "moving to the left", "moving forward", "moving backward", and "enter".

According to embodiments of the present disclosure, the first and second sensors are disposed at the first mounting, and each of the first and second sensors is capable of performing two teeth-activating tasks selected from the group consisting of "moving forward", "moving backward", and "enter"; the third sensor is disposed on the second mounting and is capable of performing two teeth-activating tasks that consist of "moving to the left" and "enter"; and the fourth sensor is disposed on the third mounting and is capable of performing two teeth-activating tasks that consist of "moving to the right" and "enter".

In accordance with the third aspect of the present disclosure, there is provided a method of operating a computer with the aid of any teeth-operated mouth mouse described herein. The method includes, selectively clicking one of the sensors disposed on the mounting by the lower teeth once or twice to instruct the single or double-clicked sensor to perform one of the teeth-activating tasks associated therewith.

These and other features of the present disclosure will become readily apparent upon further review of the following specification and drawings.

BRIEF DESCRIPTION OF THE DRAWINGS

The disclosure will become more fully understood from the detailed description and the drawings given herein below for illustration only, and thus does not limit the disclosure, wherein.

DETAILED DESCRIPTION

Detailed descriptions and technical contents of the present disclosure are illustrated below in conjunction with the accompanying drawings. However, it is to be understood that the descriptions and the accompanying drawings disclosed herein are merely illustrative and exemplary and not intended to limit the scope of the present disclosure.

1. Teeth-Operated Mouth Mouse

Figure 1A:
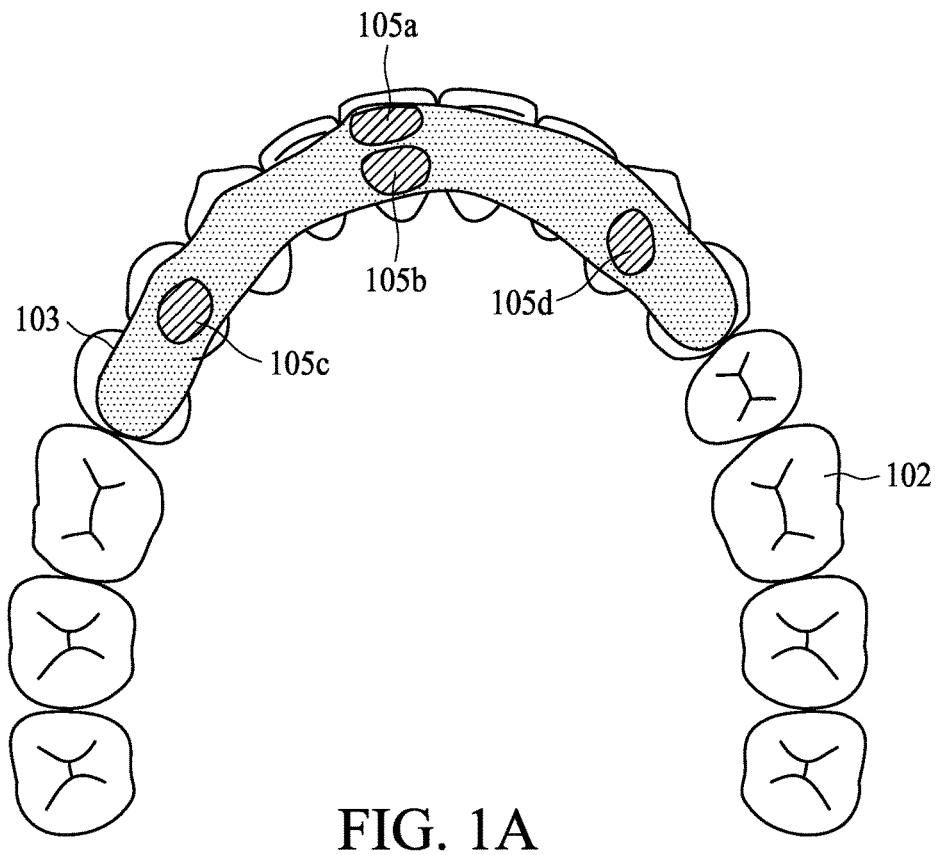
FIG. 1A is an environmental perspective view of a teeth-operated mouth mouse 100 according to one embodiment of the present disclosure.

FIG. 1A is an environmental perspective view of a teeth-operated mouth mouse 100 mounted on a row of teeth 102 of a user for operating a computer. The teeth-operated mouth mouse 100 typically includes at least, a mounting 103, and a plurality of sensors 105 disposed on various positions along the mounting 103 for transmitting and receiving instructions to and from the computer. The mounting 103, in general, conforms to the shape of the row of teeth 102 of the user in a similar manner as teeth-straightening braces. In the embodiment depicted in FIG. 1A, the mounting 103 conforms to the shape of a row of nine upper teeth, however, the number of teeth covered by the mounting 103 may be adjusted according to the need of the user.

As the mouth mouse 100 of the present disclosure is for users who cannot move or speak, thus the plurality of sensors 105 (e.g., transceivers) are disposed in a manner to provide ease and simplicity in the teeth action required for the user to selectively click-activating a given sensor mounted on a given tooth with his/her lower teeth. In the embodiment depicted in FIG. 1A, four sensors 105a, 105b, 105c, 105d are independently disposed at a position corresponding to an individual tooth along the mounting 103. Among the four sensors, two sensors 105a, 105b are disposed at the front center tooth in the center of the mounting 103, while the other two sensors 105c, 105d are disposed at teeth that are respectively to the left and right of the front center tooth, that is, respectively close to the left and right ends of the mounting 103. Note that each sensor 105a, 105b, 105c, 105d is preferably pressure-activated, and coupled to necessary electronic circuitry so that it may be activated by teeth-biting and wirelessly coupled to a computer for transmitting and receiving signals therebetween. Non-limiting examples of a sensor includes a single surface sensing device comprising a 2-dimensional array of miniature sensors such as pressure sensors, and other types of individual sensing devices (e.g., transceivers).

To operate the computer with the present teeth-operated mouth mouse 100, the user is required to click the selected sensor once or twice with his/her lower teeth so as to perform a task selected from the group consisting of "moving to the right", "moving to the left", "moving forward", "moving backward", and "enter". Except the task "enter", any of the above-identified tasks is activated by clicking the selected sensor once with the user's lower teeth thereby allowing the instruction associated therewith (e.g., "moving to the right", "moving to the left", "moving forward", or "moving backward") to be wirelessly transmitted to the corresponding receiver in the computer, allowing the computer to proceed in accordance with the transmitted instruction. As to the task "enter", it is performed by clicking the selected sensor twice with the user's lower teeth.

In the embodiment depicted in FIG. 1A, the two sensors 105a, 105b disposed at the positions corresponding to the center tooth of the mounting 103 are respectively disposed at an upper and lower areas of the center tooth mount. Preferably, the sensors 105a disposed at the upper area of the center tooth mount is capable of performing two teeth-activating tasks that consist of "moving forward" and "enter"; while the sensor 105b disposed at the lower area of the center tooth mount is capable of performing two teeth-activating tasks that consist of "moving backward" and "enter". Further, the sensor 105c disposed at the position corresponding to the tooth at the left of the center tooth of the mounting 103 is capable of performing two teeth-activating tasks that consist of "moving to the left" and "enter"; while the sensor 105d disposed at the position corresponding to the tooth at the right of the center tooth of the mounting 103 is capable of performing two teeth-activating tasks that consist of "moving to the right" and "enter".

Figure 1B:
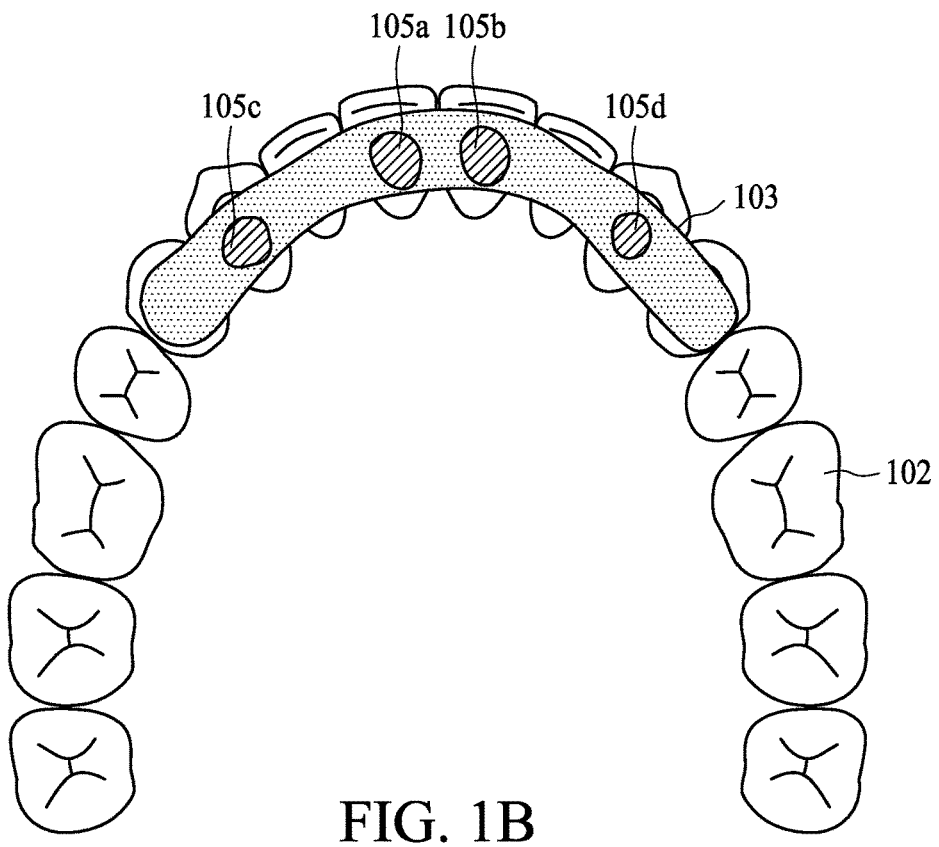
FIG. 1B is an environmental perspective view of the teeth-operated mouth mouse 100 of FIG. 1A in accordance with an alternative embodiment of the present disclosure.

Alternatively or optionally, instead of being disposed at the same tooth mount but different areas, the two sensors 105a, 105b may be disposed at the front two adjacent teeth in the center of the mounting 103, while the sensors 105c, 105d are respectively disposed at positions corresponding to teeth that are to the left and right of the front two adjacent teeth of the mounting 103 (FIG. 1B). In the embodiment depicted in FIG. 1B, the mounting 103 spans across eight upper teeth. The sensors 105a, 105b are respectively disposed at tooth mount of two adjacent teeth in the center of mounting 103, with the sensor 105a being capable of performing the tasks of "moving forward" and "enter", and the sensor 105b for the tasks of "moving backward" and "enter". The sensors 105c and 105d are respectively disposed at tooth mounts that are to the left and right of the front two adjacent teeth of the mounting 103, with the sensor 105e for performing the task of "moving to the left" and "enter", while the sensor 105d for performing the task of "moving to the right" and "enter".

2. Alternative Form of the Teeth-Operated Mouth Mouse

In the embodiment described in Section 1 of this paper, the mouth mouse 100 includes a mounting 103 that spans across a row of upper teeth, and four sensors respectively disposed at various positions of the mounting 103. The mouth mouse in this alternative embodiment differs from that in Section 1 in that, instead of having only one mounting that spans across a row of upper teeth, a plurality of mountings are used.

Figure 2A:
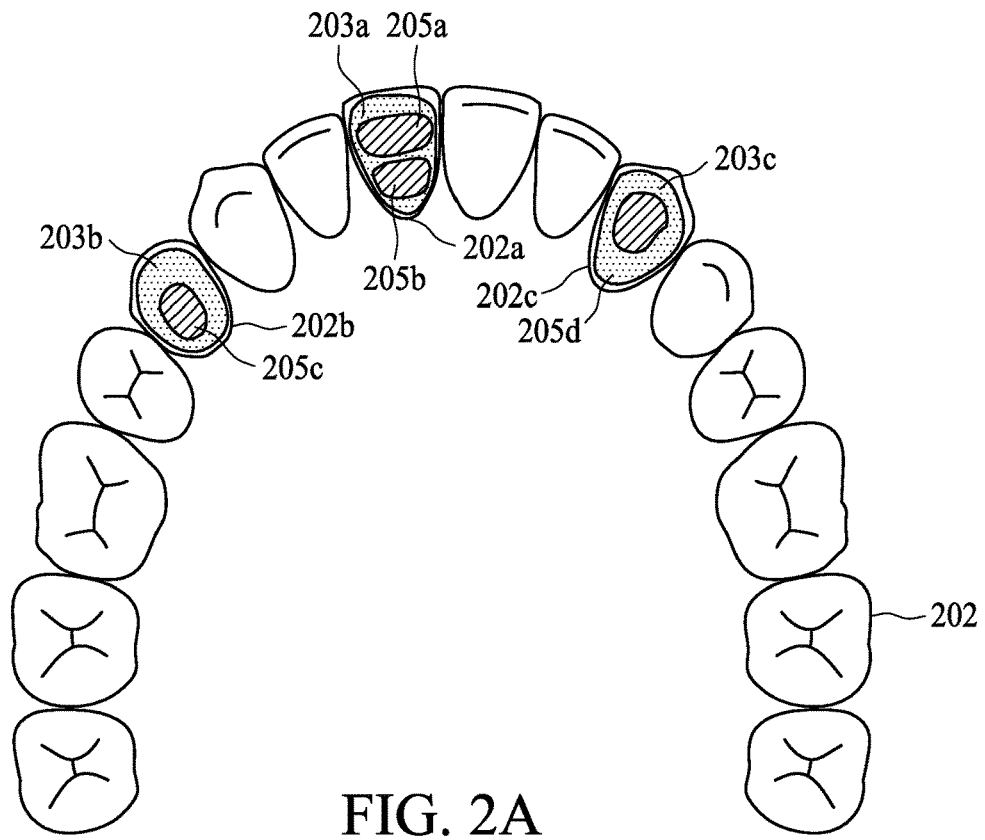
FIG. 2A is an environmental perspective view of a teeth-operated mouth mouse 200 according to one embodiment of the present disclosure.

Reference is first made to FIG. 2A, which is an environmental perspective view of the teeth-operated mouth mouse 200 of this embodiment. The mouth mouse 200 includes, at least, a first, second and third mountings 203a, 203b, 203c independently mounted on a tooth 202a, 202b, 202c; and four sensors 205a, 205b, 205c, 205d respectively disposed on the first, second, and third mountings 203a, 203b, 203c. Note that in this embodiment, each mounting is mounted on an individual tooth, specifically, the mounting 203a is mounted on the front center tooth 202a, while the mountings 203b, 203c are mounted on the teeth 202b, 202c that are respectively to the left and right of the front center tooth 202a.

Further, similar to the arrangement of the sensors depicted in FIG. 1A, in this embodiment, two sensors 205a, 205b are respectively disposed at the upper and lower areas of the mounting 203a, while the other two sensors 205c, 205d are disposed on the mountings 203b, 203c mounted on the teeth 202b, 202c, respectively.

Figure 2B:
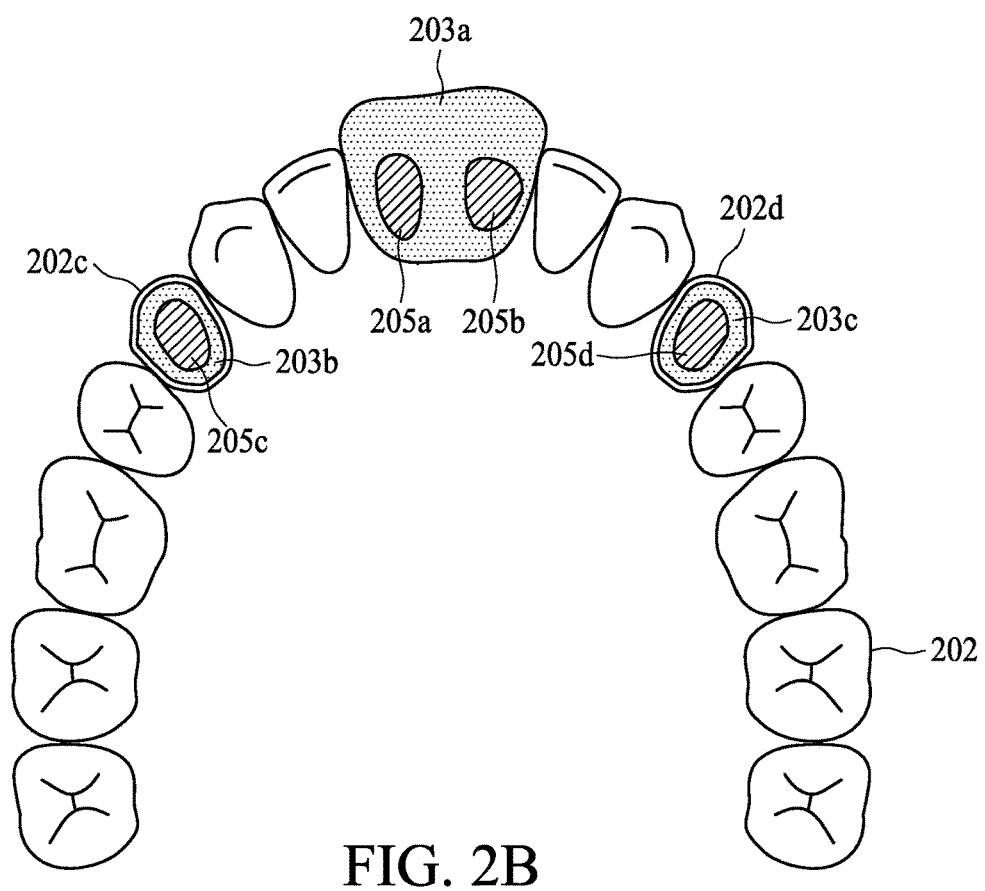
FIG. 2B is an environmental perspective view of the teeth-operated mouth mouse 200 of FIG. 2A in accordance with an alternative embodiment of the present disclosure.

Reference is now made to FIG. 2B, which depicts an alternative arrangement of the mounting 203a of the teeth-operated mouth mouse 200 of FIG. 2A. Note that in this embodiment, instead of mounting on a single individual tooth, the mounting 203a is relatively larger in size than that of the mounting 203a in FIG. 2A, and spans across the front two adjacent teeth 202a, 202b (which are not visible from FIG. 2B), thereby allowing the two sensors 205a, 205b to be disposed on positions corresponding to the two adjacent teeth of the mounting 203a; while the sensors 205c, 205d are disposed in similar manner as that described in FIG. 2A.

Each of the sensors 205a, 205b, 205c, 205d of the embodiment depicted in FIG. 2A or FIG. 2B may perform the same function as that of sensors 105a, 105b, 105c, 105d described in Section 1 of this paper. Specifically, the sensor 205a, when click-activated by the lower teeth of the user, is capable of performing the tasks of "moving forward" and "enter"; similarly, the sensor 205b is capable of performing the tasks of "moving backward" and "enter", the sensor 205c is capable of performing the tasks of "moving to the left" and "enter", and the sensor 205d is capable of performing the tasks of "moving to the right" and "enter" Further, except the task "enter", any of the above-identified tasks is activated by clicking the selected sensor once with the user's lower teeth thereby allowing the instruction associated therewith (e.g., "moving to the right", "moving to the left", "moving forward", and "moving backward") to be wirelessly transmitted to the corresponding receiver in the computer allowing the computer to proceed in accordance with the transmitted instruction. As to the task "enter", it is carried out by clicking the selected sensor twice with the user's lower teeth.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of the present disclosure.

What is claimed is:

1. A teeth-operated mouth mouse mounted in an oral cavity of a user for operating a computer comprising,
   a mounting conforming to a row of upper teeth in the oral cavity of the user; and
   four sensors mounted on the mounting and wirelessly coupled to the computer for transmitting and receiving signals therebetween, in which two of the sensors are disposed at the positions corresponding to upper and lower areas of a tooth of the center of the mounting or at the positions corresponding to the two adjacent teeth of the center of the mounting, while the other two sensors are respectively disposed at the positions corresponding to the teeth at the left and right of the center tooth of the mounting;
   wherein, each of the four sensors is capable of performing at least one teeth-activating task selected from the group consisting of "moving to the right", "moving to the left", "moving forward", "moving backward", and "enter".

2. The teeth-operated mouth mouse of claim 1, wherein the sensor disposed at the position corresponding to the upper area of the center tooth of the mounting is capable of performing two teeth-activating tasks that consist of "moving forward" and "enter"; while the sensor disposed at the position corresponding to lower area of the center tooth of the mounting is capable of performing two teeth-activating tasks that consist of "moving backward" and "enter".

3. The teeth-operated mouth mouse of claim 1, wherein each of the two sensors disposed at positions corresponding to the two adjacent teeth of the center of the mounting is capable of performing two teeth-activating tasks selected from the group consisting of "moving forward", moving backward" and "enter", provided that when one sensor performs the task of "moving forward" then the other sensor will perform the task of "moving backward", and both sensors are capable of performing the task "enter".

4. The teeth-operated mouth mouse of claim 3, wherein the sensor disposed at the position corresponding to the tooth at the left of the center tooth of the mounting is capable of performing two teeth-activating tasks that consist of "moving to the left" and "enter"; while the sensor disposed at the position corresponding to the tooth at the right of the center tooth of the mounting is capable of performing two teeth-activating tasks that consist of "moving to the right" and "enter".

5. A method of operating a computer by using the teeth-operated mouth mouse of any one of claims 2 to 4 comprising,
selectively clicking one of the four sensors on the mounting by the lower teeth once or twice to instruct the single or double-clicked sensor to perform one of the teeth-activating tasks associated therewith.

6. The method of claim 5, wherein the sensor disposed at the position corresponding to the upper area of the center tooth of the mounting is clicked once to perform the teeth-activating task of "moving forward" or twice to perform the teeth-activating task of "enter".

7. The method of claim 5, wherein the sensor disposed at the position corresponding to the lower area of the center tooth of the mounting is clicked once to perform the teeth-activating task of "moving backward" or twice to perform the teeth-activating task of "enter".

8. The method of claim 5, wherein the sensor disposed at the position corresponding to the tooth at the left of the center tooth of the mounting is clicked once to perform the teeth-activating task of "moving to the left" or twice to perform the teeth-activating task of "enter".

9. The method of claim 5, wherein the sensor disposed at the position corresponding to the tooth at the right of the center tooth of the mounting is clicked once to perform the teeth-activating task of "moving to the right" or twice to perform the teeth-activating task of "enter".

10. The method of claim 5, wherein one of the two sensors disposed at the positions corresponding to two adjacent teeth of the center of the mounting is clicked once to perform two teeth-activating tasks selected from the group consisting of "moving forward", moving backward" and "enter", provided that when one sensor performs the task of "moving forward" then the other sensor will perform the task of "moving backward", and both sensors are capable of performing the task "enter".

11. A teeth-operated mouth mouse mounted in an oral cavity of a user for operating a computer comprising,
first, second and third mountings, in which the first mounting conforms to one upper tooth or two adjacent upper teeth of the center of the mounting, while the second and third mountings are respectively disposed at the left and right of the first mounting and independently conforms to one upper tooth in the oral cavity of the use; and
four sensors respectively disposed on the first, second and third mountings and wirelessly coupled to the computer for transmitting and receiving signals therebetween;
wherein,
the first and second sensors are disposed on the first mounting and each of the first and second sensors is capable of performing two teeth-activating tasks selected from the group consisting of "moving forward", "moving backward", and "enter";
the third sensor is disposed on the second mounting and is capable of performing two teeth-activating tasks that consist of "moving to the left" and "enter"; and
the fourth sensor is disposed on the third mounting and is capable of performing two teeth-activating tasks that consist of "moving to the right" and "enter".

12. A method of operating a computer with the aid of the teeth-operated mouth mouse of claim 11 comprising,
selectively clicking one of the first, second, third and fourth sensors respectively disposed on the first, second and third mountings by the lower tooth once or twice to instruct the single or double-clicked sensor to perform one of the teeth-activating tasks associated therewith.

13. The method of claim 12, wherein the first or second sensors disposed on the first mounting is clicked once to perform the teeth-activating task of "moving forward" or "moving backward"; or clicking the first or second sensors disposed on the first mounting twice to perform the teeth-activating task of "enter".

14. The method of claim 12, wherein the third sensor disposed on the second mounting is clicked once to perform the teeth-activating task of "moving to the left" or twice to perform the teeth-activating task of "enter".

15. The method of claim 12, wherein the fourth sensor disposed on the third mounting is clicked once to perform the teeth-activating task of "moving to the right" or twice to perform the teeth-activating task of "enter".

* * * * *